June 30, 1931.  A. C. WISNER ET AL  1,812,127
WHEEL UNIT
Filed Feb. 12, 1930
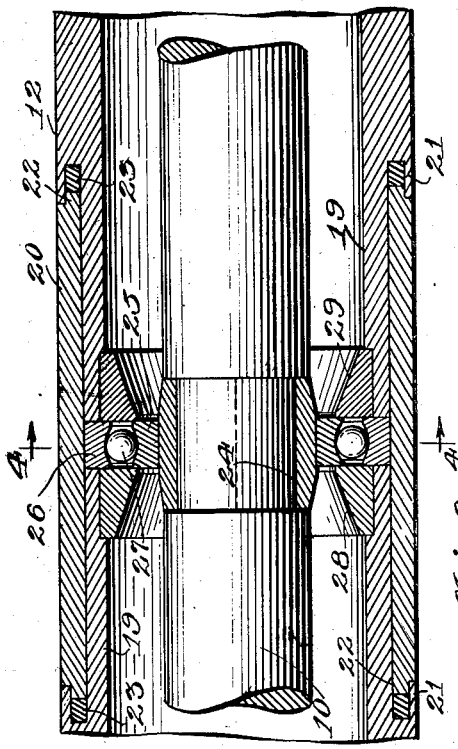
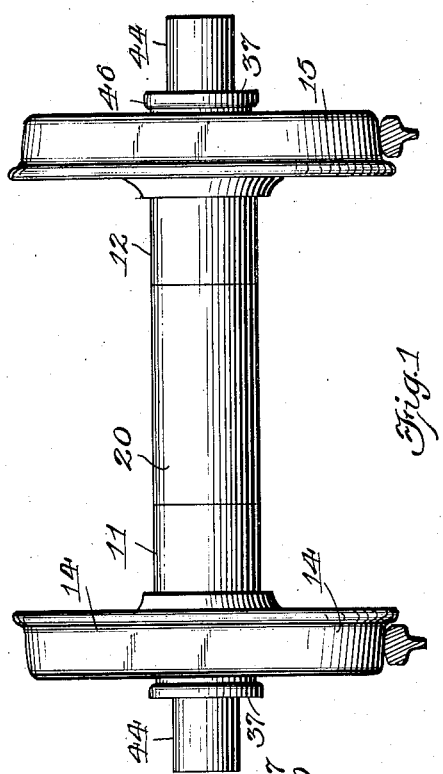
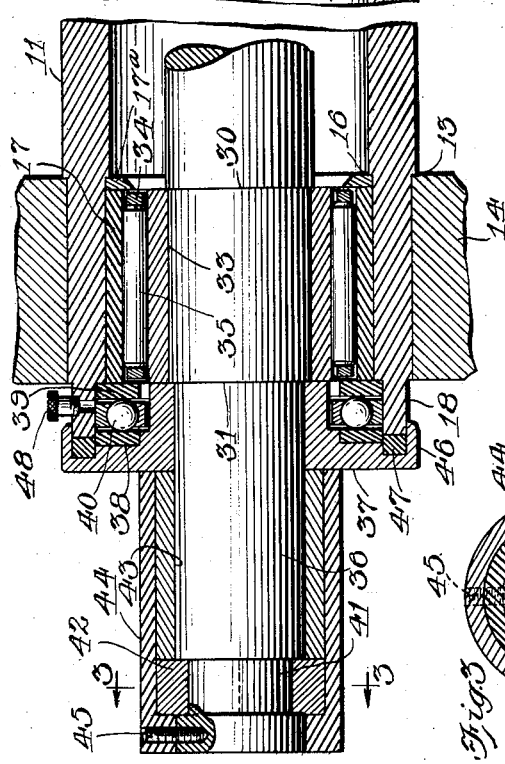
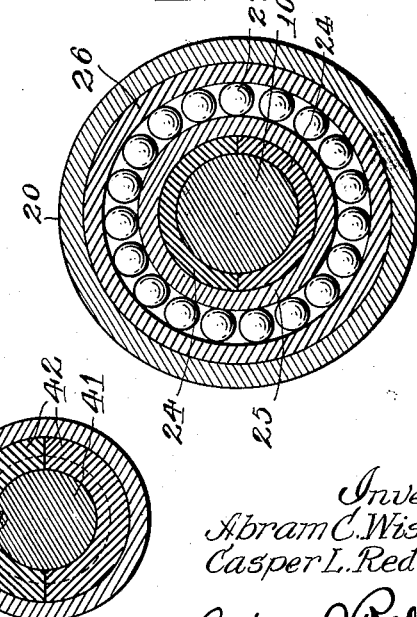
Inventors:
Abram C. Wisner
Casper L. Redfield
By Casper L. Redfield
Atty Patented June 30, 1931

1,812,127

UNITED STATES PATENT OFFICE

ABRAM C. WISNER, OF JACKSON, MICHIGAN, AND CASPER L. REDFIELD, OF CHICAGO, ILLINOIS

WHEEL UNIT

Application filed February 12, 1930. Serial No. 427,665.

Our invention relates to wheel units, and has for its object improvements in devices of that kind. While our invention has other uses, it is illustrated as a unit capable of use in railway trucks.

In the accompanying drawings

Fig. 1 is an elevation of a unit complete;

Fig. 2 is an enlarged longitudinal section of one end and the central portion, parts being broken away;

Fig. 3 is a transverse section on line 3—3 of Fig. 2; and

Fig. 4 is a transverse section on line 4—4.

In the said drawings, there is an interior stationary axle 10 and an exterior tubular axle transversely divided into sections 11 and 12. The outer ends of the sections 11 and 12 are turned down to leave shoulders, one of which is shown at 13 in Fig. 2. On the reduced ends of the tubular axle are wheels 14 and 15 secured in place by hydraulic pressure, or other suitable means.

The ends of the tubular axle are bored out to leaves shoulders 16, and in the bored out part are hardened steel bushings 17 forced into place so that the metal outside of them is under initial strain. The bushings 17 are preferably within the hubs of the wheels, but are not necessarily so. Between each bushing 17 and shoulder 16 is a small ring 17a which serves to prevent the displacement of a roller cage which will be hereinafter described. Beyond the wheels and the bushings 17, the ends of the sections 11 and 12 are bored out to a larger internal diameter and are turned down to a smaller outside diameter. This leaves the tubular projections 18.

The inner ends of the sections 11 and 12 have their outer surfaces turned down to leave the metal thereof about one-half of the previous thickness, as shown at 19, and these reduced ends are inserted in a tube 20. The fit between the parts 19 and 20 may be called a telescopic fit, that is, the fit is close, but one which will permit a free turning and sliding of the parts 19 with respect to the tube 20.

At the junctions between the full diameters of tubes 11 and 12, and the reduced parts 19, there are undercuts which leave projecting lips 21, and the ends of the tube 20 are turned down to leave ends 22 which will extend inside of the projecting lips. The construction is such that an annular space is left inside of the lips 21, and in these annular spaces are rings of packing 23.

The stationary axle is conveniently made of a piece of ordinary shafting, and extends thru the center of the tubular axle. At the center point in the length of the stationary axle, it is turned down to a somewhat smaller diameter, and in this reduced part is a ring 24 made in halves and of slightly greater diameter than the axle 10. The split ring 24 is held in place by a solid ring 25 which serves as one member of a ball race.

It is desirable to have the race ring 25 fit snugly on its seat, and it is also desirable to be able to move the ring 25 freely along the axle 10 during assembling operations. The object of the split ring 24 is to provide a convenient seat for the race ring 25.

Outside of the ring 25 is an outer race ring 26, and between these are balls 27. The race ring 26 is preferably located between the ends of the sections 11 and 12, and has its outer face fitting the inside of the tube 20. Secured in the inner ends of the sections 11 and 12 are rings 28 and 29 which serve to hold the ring 25 from displacement on its seat.

The ends of the stationary axle 10 are turned down in successive steps so as to leave successive shoulders. As both ends of this axle are alike, a description of the end shown at the left in Fig. 2 will serve for both ends.

The first step leaves a shoulder at 30, and the second step leaves another shoulder at 31. On the part 32, between shoulders 30 and 31, is forced a hardened steel sleeve 33. The bushing 17 and sleeve 33 have the relationship indicated in the drawings, and between them is a cage 34 for carrying hardened steel rollers 35. For simplicity, the cage is shown as holding long rollers, but normally the cage will be made to hold a plurality of rows of short rollers in a manner well known in the art.

On the part 36 of axle 10 is a thrust ring 37, preferably made of cast steel and preferably in contact with shoulder 31 and the sleeve 33. This thrust ring may be permitted to turn, but will preferably be held stationary on the axle 10 by any convenient means.

Inside of the thrust ring 37 is a hardened steel ring 38, and inside of the projection 18 of the tubular axle is a similar hardened steel ring 39 which is in contact with the end of the bushing 17. Between the rings 38 and 39 are balls 40 held in a suitable cage as shown. These parts furnish a thrust bearing to take longitudinal strains.

Near the end of part 36 of axle 10 is a groove 41 in which is a split ring 42 similar to the ring 24 before described. Between the ring 42 and the thrust ring 37 is a sleeve 43 which is of the same diameter as the ring 42 and which fills the space between rings 37 and 42. Over the ring 42 and sleeve 43 is another sleeve 44 which is secured to the axle 10 by any convenient means, as by the countersunk screw 45.

The ring 37 extends beyond the projecting end 18 of tube 11, and has a lip 46 which overlaps the projection 18. The construction is such that there is left an annular space in which is inserted a packing 47. In the projection 18, between the wheel 14 and the lip 46, is an oil hole closed by a cap 48.

The outside diameters of the sleeves 44 are such that the fit into the upper halves of the ordinary bearings on railway trucks, but as they do not turn in such bearings, there is no occasion to provide lubrication at these places, or to keep out dust and dirt. The load simply rests upon the sleeves 44, and consequently upon the end portions of the stationary axle 10. This axle is supported by the wheels 14 and 15 thru the intervention of the lower rollers 35.

With the axle 10 supported at the wheels, and loaded at points outside of the supports, there is a strain to flex the center of the axle upward. The bending action of this strain is resisted, however, by the ball bearing 27 and the tubular axle consisting of the parts 11, 12 and 20. The section 20 is so long, and the diameter of the tubular axle as a whole is so great, that the bending action due to the load is reduced to a negligible quantity.

The smaller the diameter of a bearing, the less is the frictional resistance to turning. That is why pivot bearings are used in very delicate instruments. By inspection, it will be seen that the roller bearings within the wheels may be extended for any desired distance inward along the axle 10, and that the stationary axle and the tubular axle are held parallel by means of the ball bearing at the center. As a consequence, large bearing surfaces for the support of great loads may be obtained without using large diameters.

It is to be observed that there are no screws or bolts except one countersunk screw 45 at each end. As these screws may be covered by the load carried on the sleeve 44, and as there is no occasion to loosen them until the load is removed, it may be said that there is nothing to get loose at any time.

By loosening the screw 45 at the left, and withdrawing the sleeve 44, the locking ring 42 falls out by itself. The sleeve 43 and ring 47 may then be withdrawn to give access to the ball bearing 40 and the rollers 35. Also, the wheel 14 with section 11 may be freely withdrawn.

It will be evident that when the locking rings 42 are in place, the axle 10 is a tie which holds all of the parts in their proper positions, and that when this tie is released by releasing a locking ring 42, the whole structure is readily taken apart.

The load is carried on the sleeves 44, and end thrust comes by the load engaging the outer face of one or the other of the rings 37. Assuming that a thrust comes on the outer face of the ring 37 shown in Fig. 2, that thrust will be conveyed thru balls 40 to section 11, and thence thru ring 26, section 12 and wheel 15 to the rail upon which that wheel runs.

When a car truck moves on a curved track, the wheels on one side travel thru a greater distance than those on the other side. If the wheels are fixed with respect to each other by being fast to the same axle body, then one half of the load is dragged over a part of the track by sliding friction. This means not only a loss of power, but wear and tear on wheels and rails. The same loss occurs on a straight track when one wheel of a pair is of slightly less diameter than the other, and a difference in diameter is the normal condition. In our construction, both wheels roll freely at all times.

The construction is such that there are rolling bearings (balls or rollers) at all places having moving surfaces under pressure. The packings 23 and 47 are so located as to retain lubricant inside of the tubular axle and to keep dust and water away from these bearings.

The tubular axle, including sections 11, 12 and 20, is preferably made of seamless tubing.

What we claim is:

1. A tubular axle transversely divided into two sections, a wheel secured to each section, a tie extending thru said axle and serving to hold the sections together, and a rolling bearing between the tie and the part of the tubular axle where the sections come together.

2. A tubular axle, wheels secured upon the ends of said axle, a second axle located in the interior of said tubular axle and having its ends extending beyond the ends of the tubular axle to receive a load, and three rolling bearings between the two axles, one of said rolling bearings being located midway in the lengths of said axles.

3. A tubular axle transversely divided into two sections, a tube into which the adjacent ends of said sections telescopically fit, said parts being so constructed as to provide interior spaces for packing at the ends of the tube when said sections are at their nearest approach to each other, and a tie spaced from the sections and serving to hold said sections at their nearest approach while permitting them to turn with respect to each other and with respect to said tube.

4. The combination with a tube and a shaft extending longitudinally thru said tube, one of said parts being arranged to rotate with respect to the other, of a rolling bearing between the tube and the shaft, and a mounting for said bearing, said mounting consisting of a divided ring located in a recess of one of said parts and held in place by the part for which it is a mounting.

5. A tubular axle transversely divided into two sections and having wheels secured near the ends thereof, an interior axle located within the tubular axle and having its ends extending beyond the ends of the tubular axle, load carrying rolling bearings between the axles at about the points where the wheels are located, thrust rings mounted upon the extending parts of the interior axle, other rolling bearings located between the thrust rings and shoulders on the tubular axle, locking rings located in grooves in the interior axle and serving to hold the thrust rings from axial displacement, and means for retaining the locking rings in place.

6. A tubular axle, an interior axle located within the tubular axle and having its ends extending beyond the ends of the tubular axle, thrust rings secured to the interior axle beyond the ends of the tubular axle and providing annular recesses into which the ends of the tubular axle project, and packing rings inside of said recesses and compressed by the ends of the tubular axle.

7. A tube consisting of two sections, a wheel secured to the outer end of each section, a second tube in which the inner ends of said sections fit and may slide and turn, an interior axle having its ends extending beyond the ends of the tube and serving to support a load, and connections by which the interior axle serves to restrain the sliding action of the sections with respect to the second tube.

8. A tubular axle, wheels secured to the ends of the axle, a central axle extending thru the tubular axle and spaced therefrom, said central axle having its ends extending beyond the ends of the tubular axle to receive a load, and a rolling bearing between the two axles at the centers of their lengths.

9. A tubular axle transversely divided into two sections, a wheel secured to the outer end of each section and the inner end of each section reduced in outside diameter, a second tube having a telescopic fit upon the reduced ends of said sections and serving by the length of such fit to hold the sections in line with each other, and a central tie serving to restrain a sliding action of the sections with respect to the second tube.

10. A rotating tubular axle transversely divided into two sections, a wheel secured to the outer end of each section, a second rotating tube in which the inner ends of said sections fit and may slide and turn, the length of the bearing of the second tube on the ends of the sections being sufficient to retain the sections in line against lateral thrusts, and a central tie serving to restrain the sliding action while permitting the turning action.

11. A tubular axle consisting of a rotating central section and two end sections having their inner ends extending into and guided by the central, wheels secured to the outer ends of the end sections, and an inner tie serving to hold the sections from longitudinal displacement while permitting one end section to turn with respect to the other end section.

12. A tube consisting of two sections, a wheel secured to the outer end of each section, a second tube in which the ends of said sections fit and may slide and turn, and an interior axle having its ends extending beyond the ends of the tubular axle to receive a load, said interior axle serving as a tie for said sections to restrain a sliding action while permitting a turning action in said second tube.

13. A tubular axle consisting of alined sections, an alining tube therefor, a wheel secured to the outer end of each section, and a central axle extending thru said sections and serving to carry a load, said central axle also serving as a tie to restrain the sections from longitudinal movement with respect to each other while permitting said sections to turn with respect to the alining tube.

14. A tubular axle composed of two end sections and a middle section, said middle section serving to aline the end sections and being held from axial displacement by said end sections, a central axle serving as a load carrier and also serving as a tie to retain the end sections from axial displacement, and wheels secured to the outer ends of said end sections.

15. A tubular axle composed of two end sections, a middle section consisting of a piece of wrought tubing serving to aline the end sections and held in place by the sections which it alines, a central tie serving to restrain longitudinal movement of the end sections with respect to the middle section which they hold, and wheels on the outer ends of the end sections.

ABRAM C. WISNER.
CASPER L. REDFIELD.